United States Patent [19]

Feustel et al.

[11] Patent Number: 5,552,962
[45] Date of Patent: Sep. 3, 1996

[54] INTERCONNECT AND CROSS-CONNECT EQUIPMENT INCLUDING JACK PANEL

[75] Inventors: Clay A. Feustel, Lawrenceville, Ga.; John M. Scaglione, Denville, N.J.

[73] Assignee: AT&T Corp, Murray Hill, N.J.

[21] Appl. No.: 250,253

[22] Filed: May 27, 1994

[51] Int. Cl.$^6$ .................. H01R 17/18; H04M 5/00; H05K 7/00
[52] U.S. Cl. .................. 361/733; 361/826; 379/325; 439/188; 439/668
[58] Field of Search .................. 200/50 R, 50 C, 200/51 R–51.17, 175–180; 439/43–54, 188, 668; 379/156, 166, 200, 220, 275, 325, 327–333; 375/36, 257; 361/679, 728–735, 823, 826, 829

[56] References Cited

U.S. PATENT DOCUMENTS

| | | |
|---|---|---|
| 3,509,297 | 4/1970 | King ..................... 200/51 R |
| 3,869,582 | 3/1975 | Humphrey et al. ................. 379/325 X |
| 4,096,359 | 6/1978 | Barsellotti ................. 379/166 |
| 4,237,352 | 12/1980 | Seiden ................. 379/325 X |
| 4,476,357 | 10/1984 | Malmborg et al. ................. 200/51.09 |
| 4,618,194 | 10/1986 | Kwilas ................. 439/64 |
| 4,705,921 | 11/1987 | Rabey et al. ................. 200/50 B |
| 4,815,104 | 3/1989 | Williams et al. ................. 375/257 |
| 5,127,851 | 7/1992 | Hilbert et al. ................. 379/328 X |
| 5,199,878 | 4/1993 | Dewey et al. ................. 439/49 |
| 5,233,501 | 8/1993 | Allen et al. ................. 361/733 |
| 5,265,156 | 11/1993 | Eason et al. ................. 379/327 |
| 5,439,395 | 8/1995 | Laukzemis ................. 439/668 |

*Primary Examiner*—J. R. Scott

[57] ABSTRACT

Disclosed are interconnect and cross-connect equipment which permit easy cutover and restoration of telecommunications services. Coupled to plug-receiving jacks is a series of relays which are not activated until a button is depressed after the plugs are inserted to effect the cutover.

6 Claims, 5 Drawing Sheets

INTERCONNECT AND CROSS-CONNECT EQUIPMENT INCLUDING JACK PANEL

BACKGROUND OF THE INVENTION

This invention relates to apparatus for cross-connection and interconnection of telecommunications equipment.

In telephone central offices, jack panels are used extensively for monitoring, testing, and rearranging of digital equipment. For example, digital cross-connect (DSX) apparatus includes a multiplicity of panels within an equipment frame, with each panel including a number of plug-receiving jacks on the front surface and connectors on the front and back surface for coupling to telecommunications digital equipment. (See, e.g., U.S. Pat. No. 4,618,194 issued to Kwilos.) Similar panels exist for interconnecting equipment where two of the jacks or connectors couple equipment to a digital access cross-connect (DACS) module which performs the maintenance and cross-connection functions electronically.

In standard cross-connect and interconnect panels, the jacks are coupled to switches so that electrical paths are modified as soon as a plug is inserted in the jack. (See, e.g., U.S. Pat. No. 4,815,104 issued to Williams et al.) When it is desired to patch two panels together, it is usually required to insert both ends of a patch cord in their respective jacks simultaneously or follow a detailed procedure involving use of signal regenerators or amplifiers to avoid any loss of service. Such a procedure is quite inconvenient for the craftsperson, especially when the panels are separated by a large distance.

SUMMARY OF THE INVENTION

The invention is a jack panel comprising a first and second set of connectors adapted for electrically coupling the panel to first and second telecommunications apparatus, and a plurality of electrical plug-receiving jacks on a front surface of the panel adapted for electrically connecting, through patch cords, one of said telecommunications apparatus to a third telecommunications apparatus coupled to another panel of the same type. The plug-receiving jacks are of a type which do not alter the electrical connections in the panel when a plug is inserted therein. Means are provided in the panel for electrically connecting the first set of connectors to the second set of connectors. Means are also provided for switching the electrical connection of the first set of connectors to the plug-receiving jacks and means are further provided in the front of the panel for activating said switching means.

BRIEF DESCRIPTION OF THE DRAWING

These and the features of the invention are delineated in detail in the following description. In the drawing.

It will be appreciated that, for purposes of illustration, these figures are not necessarily drawn to scale.

DETAILED DESCRIPTION

Figure 1:
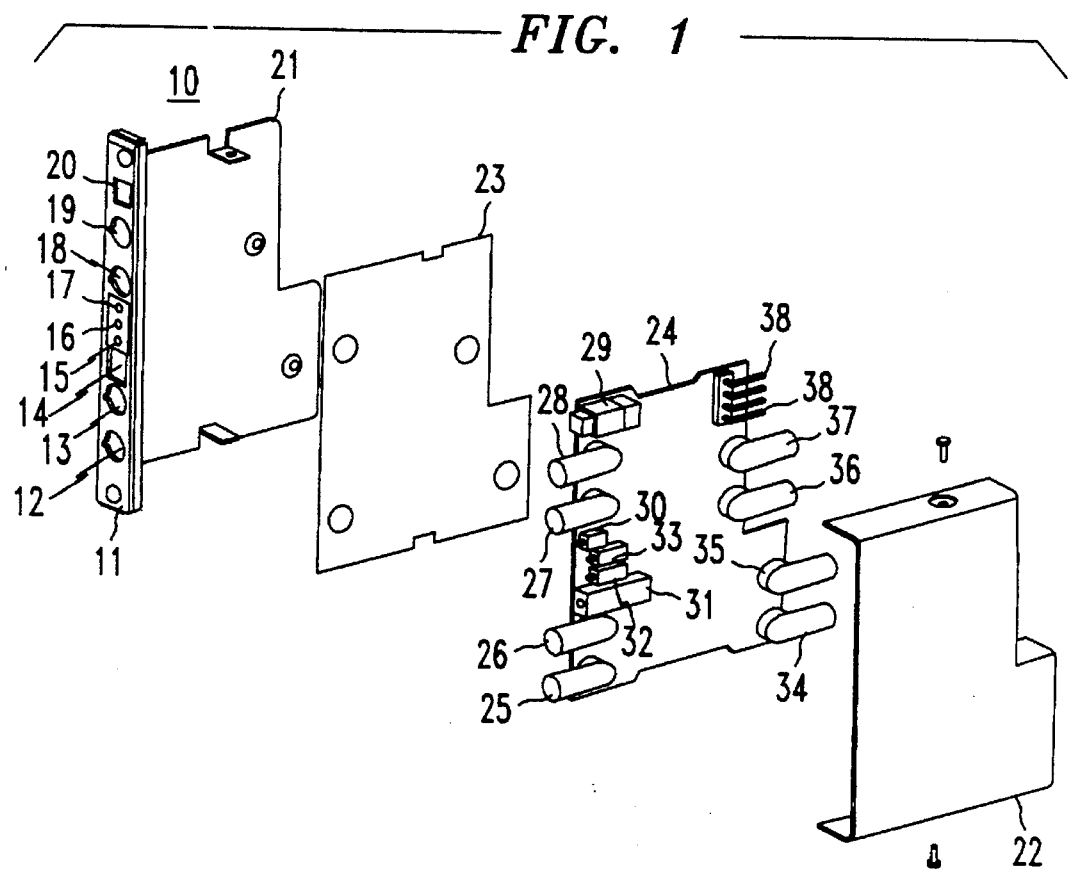
FIG. 1 is an exploded perspective view of a panel in accordance with an embodiment of the invention.

As illustrated in FIG. 1, the jack panel 10 includes a front surface 11 with a plurality of apertures, 12–20, therein. The panel has two side walls, 21 and 22. In between the two side walls, 21 and 22, are a mylar sheet 23 and a printed circuit board 24.

The circuit board includes on a front edge a set of jacks, 25–28, which are aligned with respective apertures (12, 13 and 18, 19) in the panel front surface and are capable of receiving standard plugs (not shown) therein. In this example, the jacks are in the form of standard BNC coaxial connectors. Also included on the front edge of the board is a light emitting diode (LED) 29, which protrudes through an aperture 20 in the front surface, another LED 30, which protrudes through another aperture 17 in the front surface, and a bantam jack 31, which also protrudes through a respective aperture 14 in the front surface. Further, a pair of buttons, 32 and 33, are also mounted on the front edge of the board and protrude through corresponding apertures 15 and 16 in the front surface. These buttons are conventional type push button switches.

The back edge of the circuit board 24 also includes a set of plug-receiving jacks, 34–37, which protrude through apertures in the back surface of the panel (not shown). A set of electrical pins, 38, is also provided on the back edge of the board for connection to a power source (not shown).

The various elements on the board 24 are electrically connected by conductive paths (not shown) formed on the surface of the board by standard techniques.

Figure 2:
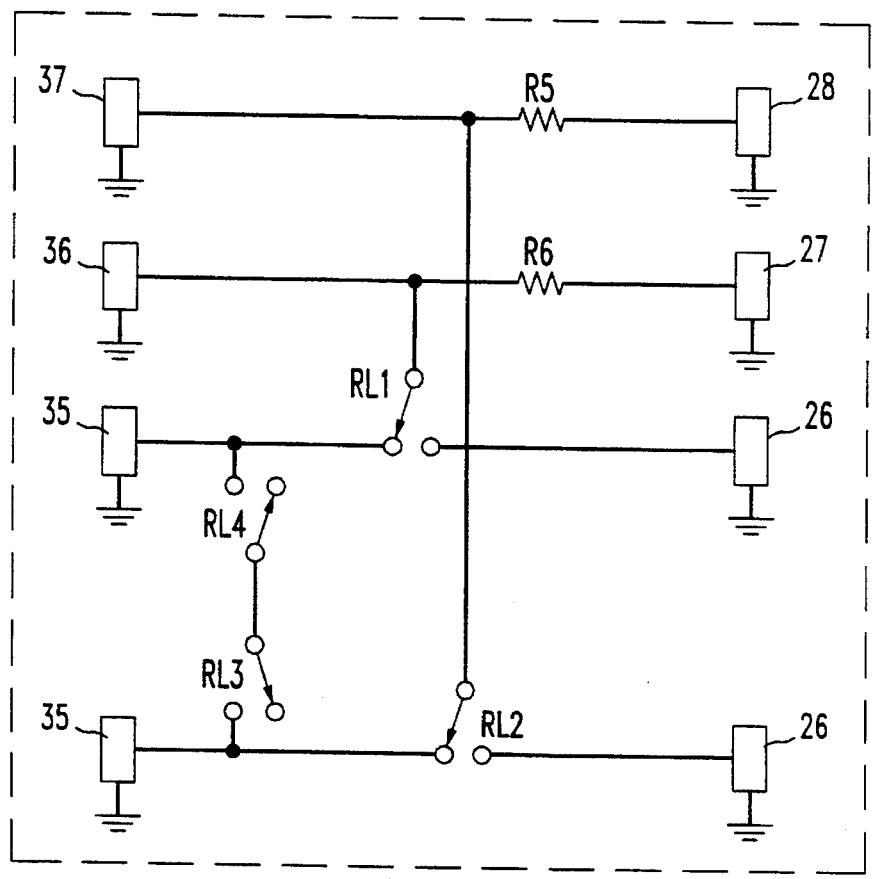
FIGS. 2–5 are schematic circuit diagrams of various portions of the panel illustrated in FIG. 1.

FIG. 2 is a schematic diagram showing the electrical interconnection of the various jacks. (The position of jacks 34, 35, 25 and 26 has been changed for purposes of clarity in the schematic.) In the "through mode," as illustrated; jacks 36 and 37 are electrically coupled through switches RL1 and RL2 to corresponding jacks 34 and 35. In this example, the switches RL1 and RL2 are latching relays, but other switching means can be employed. Jacks 27 and 28, which comprise the monitor ports of the panel, are resistively coupled to jacks 36 and 37, respectively. Switches RL3 and RL4, in the "through mode," are connected together and floating.

When it is desired to provide a patching function ("patch mode"), as discussed in more detail below, the switches RL1 and RL2 are thrown so that jacks 36 and 37 are electrically coupled to jacks 25 and 26, respectively. At the same time, switches RL3 and RL4 are thrown so that jacks 34 and 35 are now electrically connected to provide a loop-back path for any equipment coupled to these jacks.

It is important to note that jacks 25–28 and 34–37 are of a type which receive a plug without re-muting any of the electrical paths in the panel. Thus, switches RL1, RL2, RL3 and RL4 require activation circuits to change the switch positions. Such activation circuits are illustrated in FIGS. 3 and 4.

Figure 3:
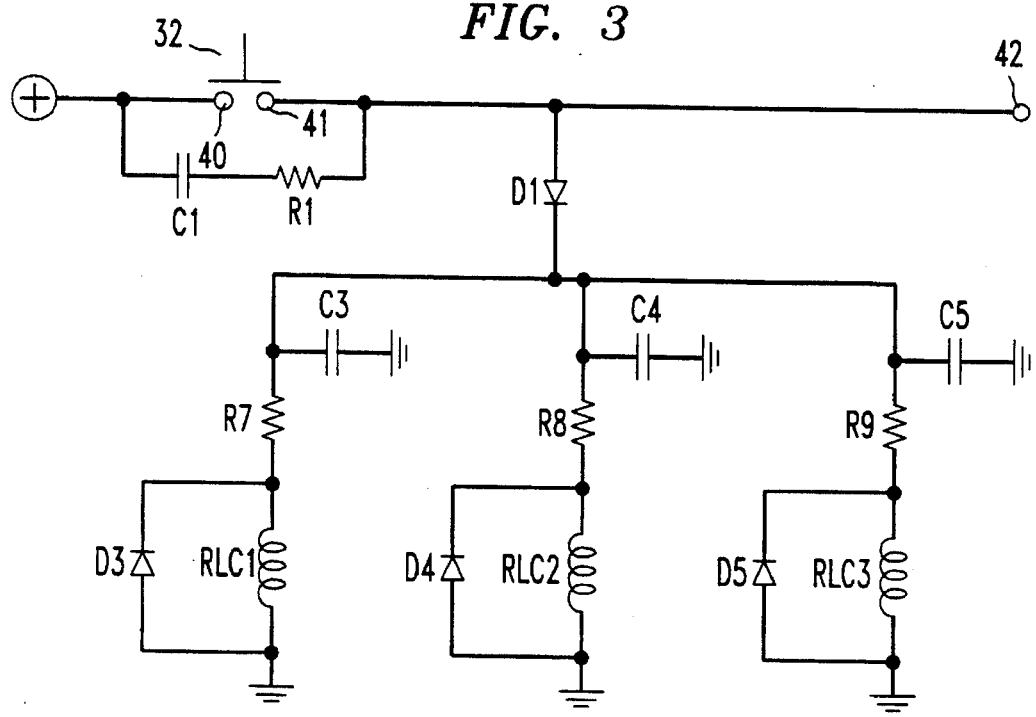
Figure 4:
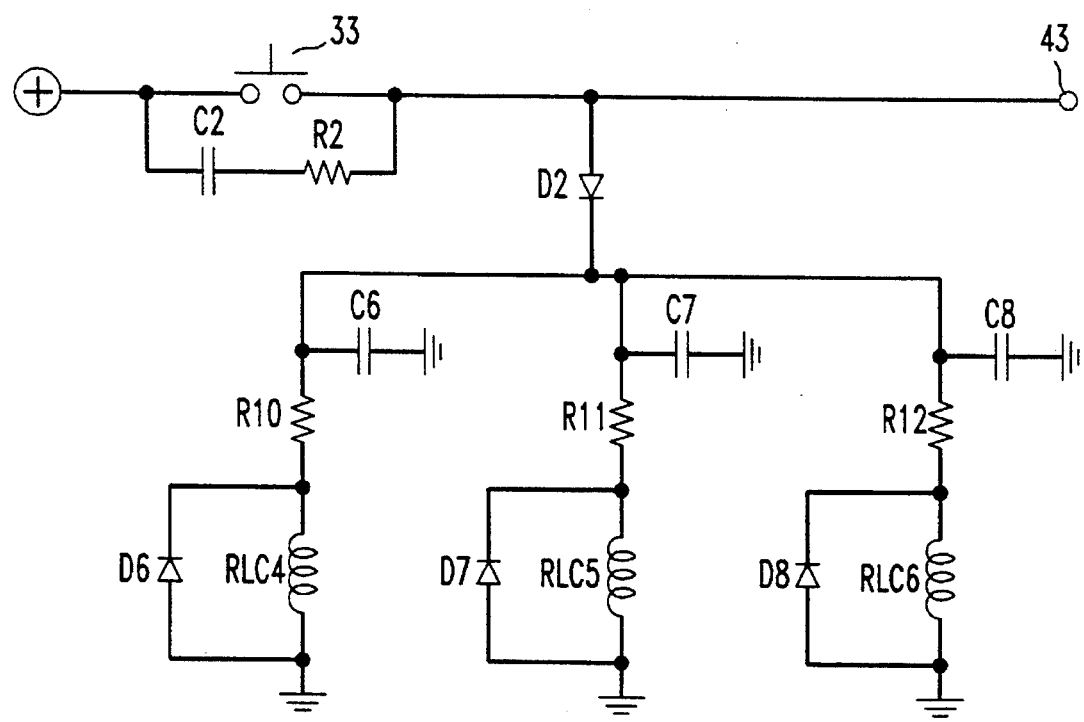

In FIG. 3, button 32 (see also FIG. 1) bridges terminals 40 and 41 when depressed. Terminal 40 is coupled to a power supply through one of pins 38 of FIG. 1, and to one plate of a capacitor $C_1$. Terminal 41 is coupled to a resistor $R_1$ which, in rum, is coupled to the other plate of capacitor $C_1$. $R_1$ and $C_1$, therefore, serve the function of arc suppression. Terminal 41 is also coupled to terminal 42 which, in rum, is coupled to the bantam jack 31 of FIG. 1.

Figure 5:
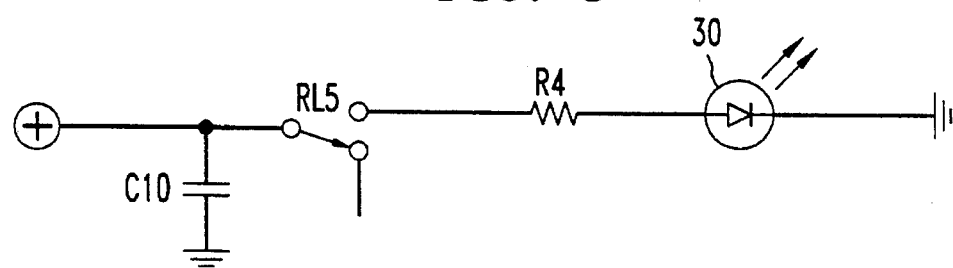

Terminal 41 is further coupled to the anode of a diode, $D_1$, whose cathode is coupled to one end of each of three resistors $R_7$, $R_8$, and $R_9$. The same end of resistors $R_7$, $R_8$ and R₉ is coupled to one plate of respective capacitors C₃, C₄ and C₅. The other plate of each capacitor C₃, C₄ and C₅ is coupled to ground. The other end of each of resistors R₇, R8 and R₉ is coupled to one end of respective relay coils RLC1, RLC2 and RLC3. RLC1 is positioned to throw switches RL1 and RL3 of FIG. 2, while RLC2 is positioned to throw switches RL2 and RL4 of FIG. 2. Coil RLC3 is positioned to throw switch RL5 of FIG. 5 which operates the patch indicator (LED 30). Diodes D₃, D₄ and D₅ are coupled in parallel with coils RLC1, RLC2 and RLC3 to provide arc suppression.

Thus, in operation, after the plugs are inserted into jacks 25 and 26 and with the switches in an initial position shown in FIG. 2, the button 32 of FIG. 3 is depressed to send a current through the coils RLC1, RLC2 and RLC3. This causes switches RL1–RL4 to switch to their alternate positions so that jacks 36 and 37 are now connected to jacks 25 and 26, respectively, and jacks 34 and 35 are now coupled together to form a loop-back path for equipment coupled to those jacks. At the same time as previously mentioned, switch RL5 (FIG. 5) is thrown to its alternate position so that LED 30 lights up to indicate a patching mode.

FIG. 4 is essentially the same circuit configuration as FIG. 3 except that button 33 activates relays RLC4, RLC5 and RLC6. Relay RLC4 is positioned to throw switches RL1 and RL3 back to their original positions (FIG. 2) when button 33 is depressed, and relay RLC5 is positioned to also throw switches RL2 and RL4 back to their original positions when button 33 is depressed. At the same time, relay RLC6 will throw switch RL5 to deactivate LED 30.

Figure 6:
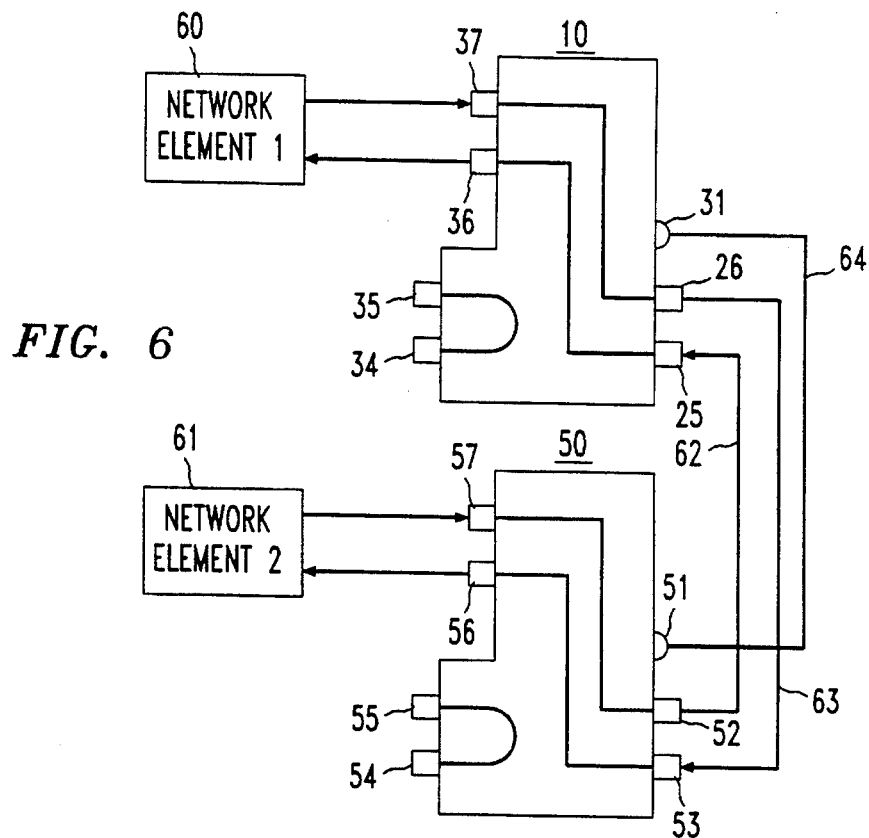
FIGS. 6–9 are schematic side views of a pair of panels such as shown in FIG. 1 illustrating the connection of the panels to telecommunications equipment.

FIGS. 6–9 illustrate how a typical in-service cutover procedure can be performed between two panels, 10 and 50, with many features on the front panel omitted for the sake of clarity. In the illustration of FIG. 6, a first network element 60 is coupled to jacks 36 and 37, while a second network element 61 is coupled to corresponding jacks 56 and 57 of panel 50. These network elements can be, for example, fiber optic terminals. A three-pronged jumper cable, including wires 62, 63 and 64, is connected by means of a three-pronged plug to jacks 25, 26 and 31, respectively. The plug at the opposite end of the wires is inserted into corresponding jacks of panel 50 so that output jack 26 of panel 10 is coupled to input jack 53 of panel 50, and input jack 25 of panel 10 is coupled to output jack 52 of panel 50. At the same time, bantam jack 31 of panel 10 is coupled to bantam jack 51 of panel 50. When button 32 of panel 10 is pressed, network element 60 is electrically coupled to network element 61 through the wires 62 and 63. Wire 64 electrically connects the button 32 of panel 10 to the activation circuit of panel 50 through terminal 42 (see FIG. 3) so that only one button needs to be depressed to throw all the switches of both panels. The yellow LEDs on both panels will also light to indicate a patching mode.

Figure 7:
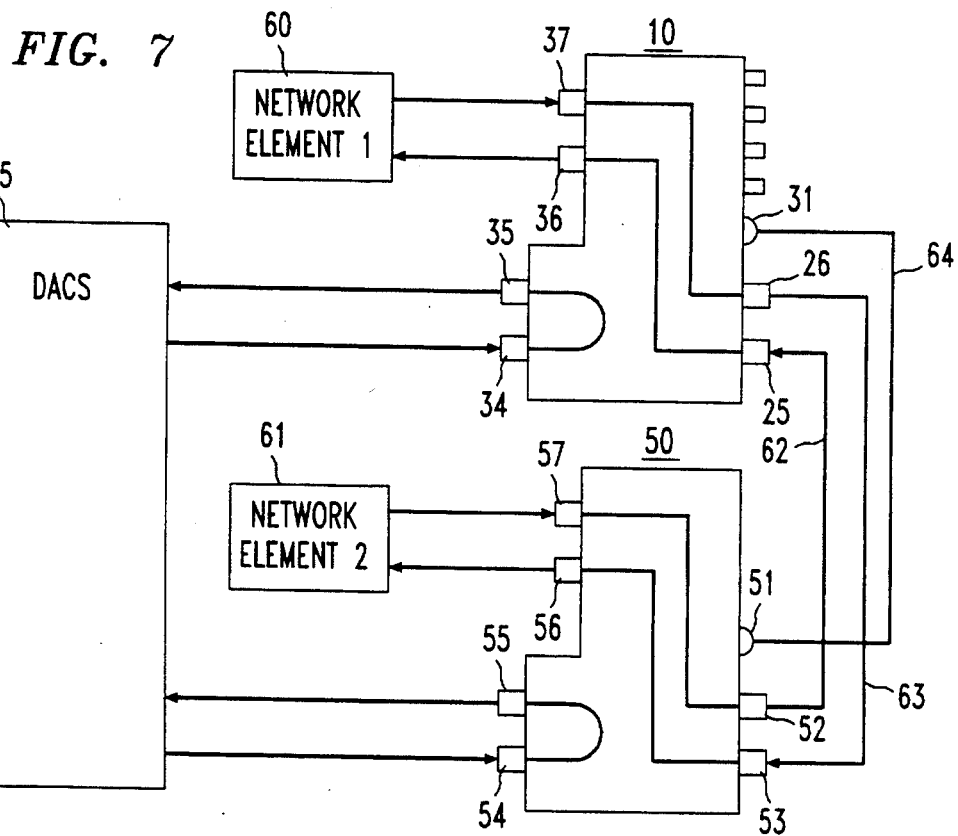

If it is now desired to install a digital access cross-connect (DACS) machine 65, it can be coupled to the jacks 34 and 35 of panel 10 and jacks 54 and 55 of panel 50 as shown in FIG. 7. Since jacks 34, 35 and 54, 55 are in a loop-back mode, the DACS machine can be tested without disrupting service between the network elements.

Figure 8:
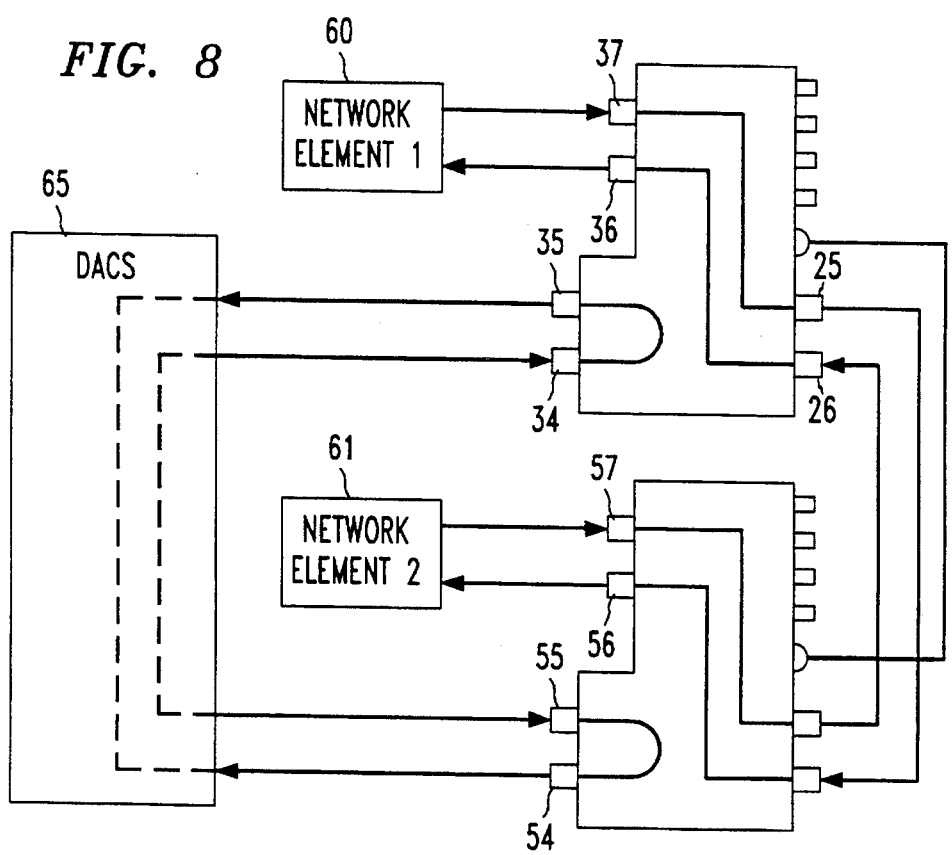
Figure 9:
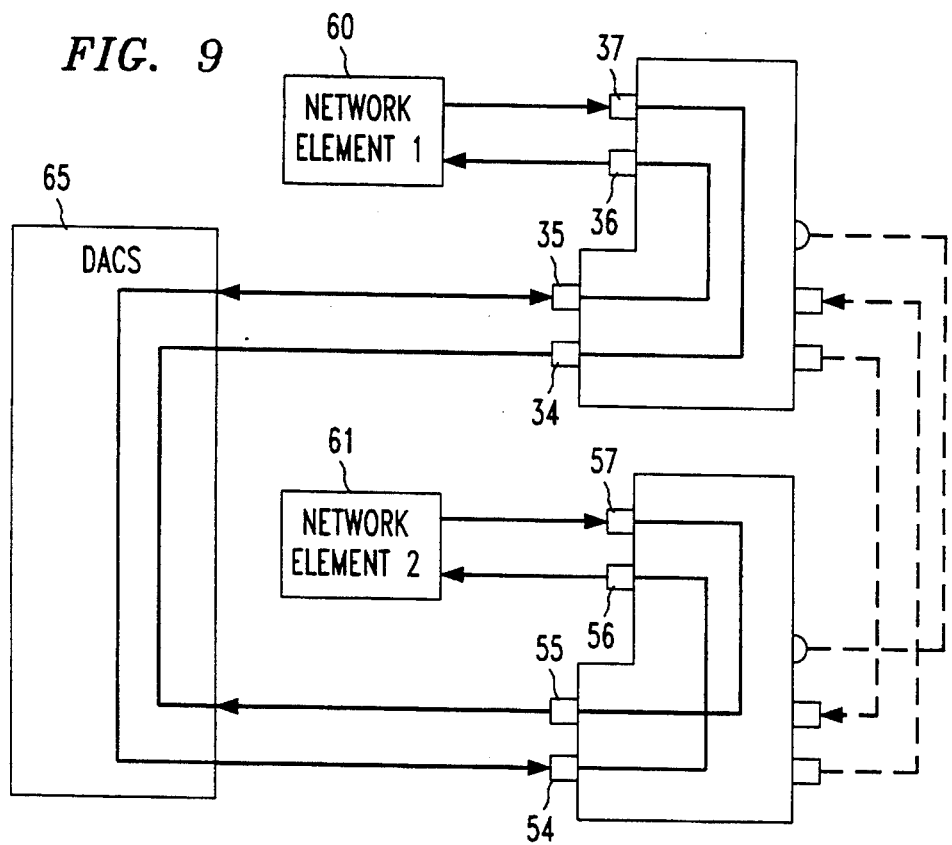

As illustrated in FIG. 8, the DACS machine 65 can then be programmed to provide the appropriate mapping to achieve the desired cross-connect between panels 10 and 50. Finally, as illustrated in FIG. 9, the button 33 (of FIG. 4) is depressed to throw the switches in both panels 10 and 50, to electrically connect jack 37 to jack 35 and jack 36 to jack 34 in panel 10, and jack 57 to jack 55 and jack 56 to jack 54 in panel 50. This connects the network elements 60 and 61 through the DACS machine 65. Wires 62, 63 and 64, now shown in phantom, no longer provide electrical connection and can be removed or kept in place in the event of a breakdown of the DACS machine.

While the present invention has been described primarily in the context of an interconnect panel, it should be appreciated that the invention is equally applicable for a rear cross-connect panel. Such panels may substitute the BNC connectors (34–37) coupled to digital equipment with wire-wrapped terminals or with 440-type jacks having built-in switches. Consequently, it should be understood that, in the context of this application, the term "connector" is intended to be broad enough to include any type of electrical connection, while the term "jack" is intended to include only connectors which are capable of receiving an electrical plug therein.

Various additional modification of the invention will become apparent to those skilled in the art. All such variations which basically rely on the teachings through which the invention has advanced the art are properly considered within the scope of the invention.

We claim:

1. A jack panel comprising:

a first and second set of connectors electrically connectable to first and second telecommunications apparatus;

a plurality of electrical plug-receiving jacks on a front surface of the panel electrically connectable to patch cords, for electrically connecting one of said telecommunications apparatus to a third telecommunications apparatus coupled to another panel of the same type, the plug-receiving jacks being of a type which do not alter electrical connections in the panel when a plug is inserted therein;

means for electrically connecting the first set of connectors to the second set of connectors;

means for switching the electrical connector of the first set of connectors to the plug-receiving jacks; and means provided in the front surface of the panel for activating said switching means.

2. The panel according to claim 1 wherein the means for switching comprises a plurality of relays in the panel.

3. The panel according to claim 1 wherein the switch-activating means comprises a button on the front surface of the panel which causes a current to be sent through relay coils in the panel in order to change the state of the switching means.

4. The panel according to claim 1 further comprising an additional jack adapted to connect the switching means of said panel with switching means of the panel of similar type when a plug is inserted therein so that the switch activation means of said panel operates on both panels.

5. The panel according to claim 1 wherein the jacks comprise BNC connectors.

6. The panel according to claim 1 further comprising additional switching means for connecting together the second set of connectors when the first set of connectors is coupled to the plug-receiving jacks.

* * * * *